G. A. STOTZ.
COMBINED MOLD AND CASTING DEVICE.
APPLICATION FILED AUG. 4, 1908.
920,684.
Patented May 4, 1909.
2 SHEETS—SHEET 1.
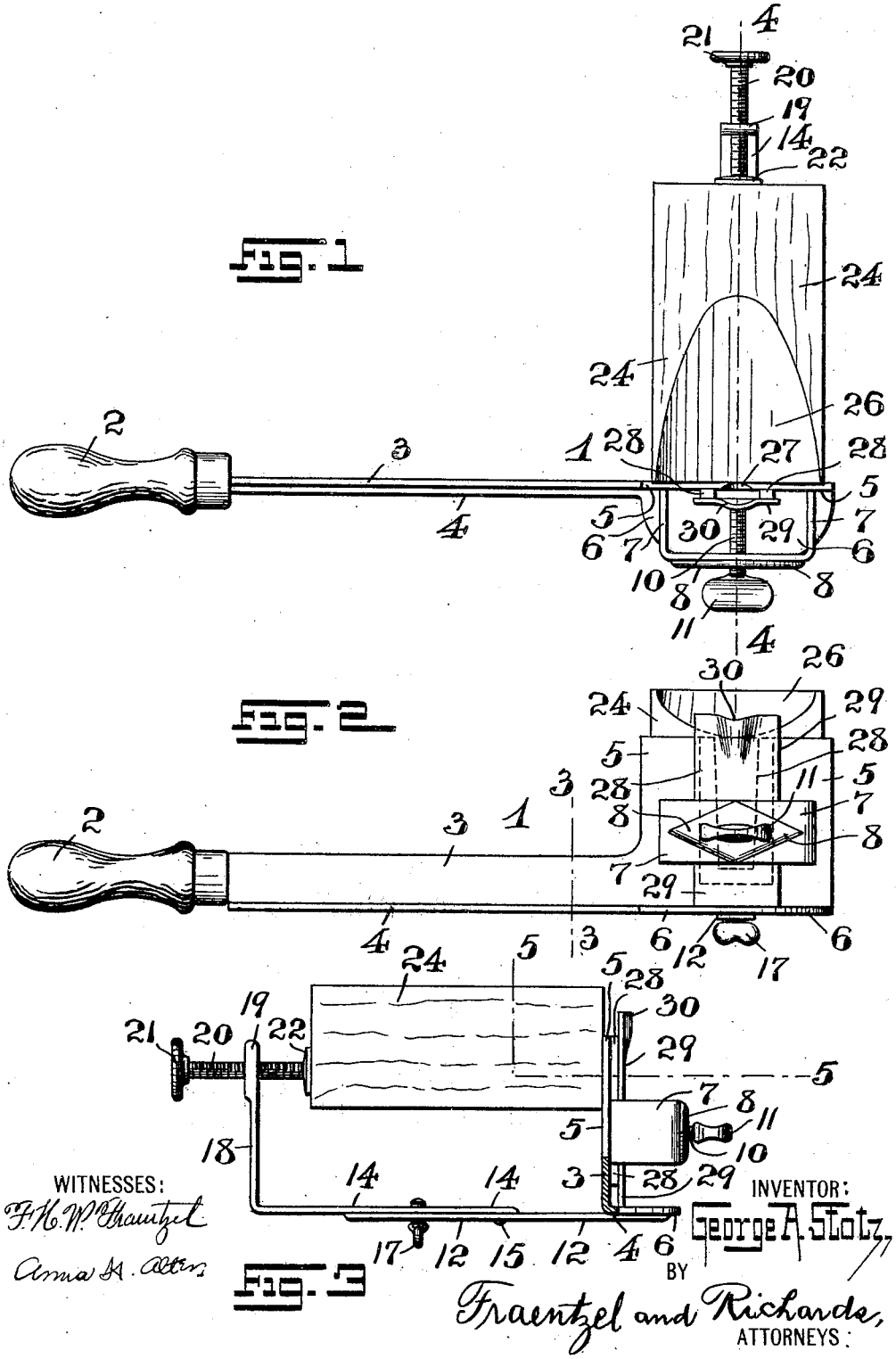
WITNESSES:
INVENTOR:
George A. Stotz,
BY
Fraentzel and Richards,
ATTORNEYS.

G. A. STOTZ.
COMBINED MOLD AND CASTING DEVICE.
APPLICATION FILED AUG. 4, 1908.
920,684.
Patented May 4, 1909.
2 SHEETS—SHEET 2.
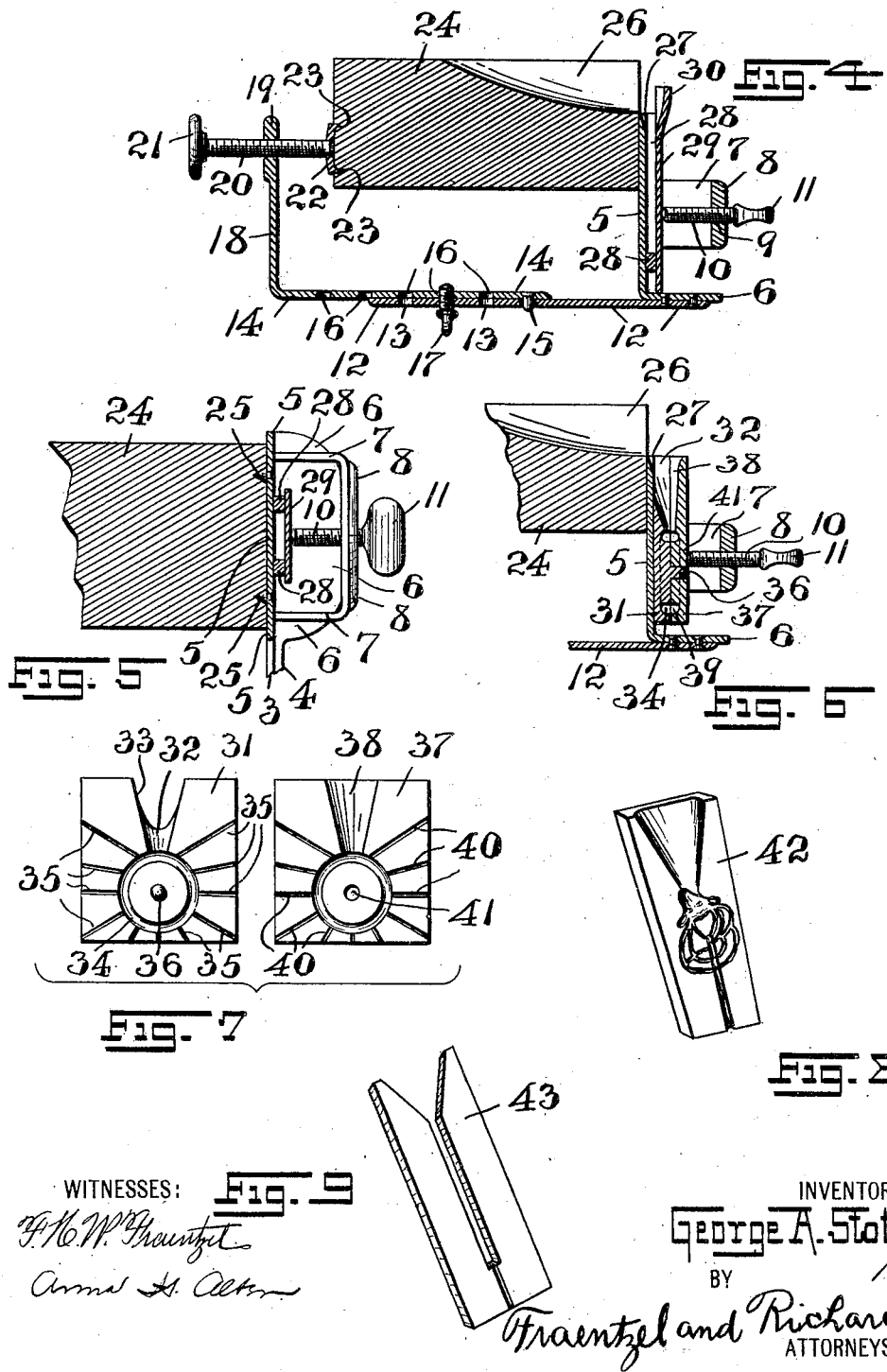
WITNESSES:
INVENTOR:
George A. Stotz,
BY
Fraentzel and Richards,
ATTORNEYS

UNITED STATES PATENT OFFICE.

GEORGE A. STOTZ, OF NEWARK, NEW JERSEY.

COMBINED MOLD AND CASTING DEVICE.

No. 920,684.      Specification of Letters Patent.      Patented May 4, 1909.

Application filed August 4, 1908. Serial No. 446,962.

*To all whom it may concern:*

Be it known that I, GEORGE A. STOTZ, a citizen of the United States, residing at Newark, in the county of Essex and State of New Jersey, have invented certain new and useful Improvements in a Combined Mold and Casting Device; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, more generally, to improvements in jewelers' molds; and the invention relates, more particularly, to a novel mold apparatus or device combining with a mold a means forming part of the device, upon which the metal to be cast is melted and in its fluid state can be poured directly into the mold, the device being especially adapted for use by jewelers having small stores, and the said mold being easily and quickly manipulated to melt and mold gold, or other metals, and turn the same into ingots and small articles of jewelry, such as rings, scarf and breast-pins, and the like.

The invention has for its principal object to provide a simple, strong and efficient mold, which provides in connection with a mold-chuck for holding a small mold, a melting surface or matrix block whereon the gold or other metal is melted by application of a flame produced by means of an ordinary construction of blow-pipe or similar apparatus, and so arranged that the gold, or other metal, when melted may be caused to run into said mold by tipping the said matrix-block.

A further object of the present invention is to provide a hand-mold by means of which the jeweler can quickly and easily melt and mold gold or other metal, or old articles of jewelry, with the same apparatus and practically in one operation.

A further object of this invention is to avoid the use of separate molds and melting blocks or other suitable melting device, such as a crucible in which the metal is melted so as to thoroughly overcome the danger of chilling the fluid metal while pouring the same from the melting device into a cold mold, the mold in this case forming part of the complete device being suitably heated from the heat taken up by the walls of the mold during the operation of melting the metal upon the melting block.

Other objects of the present invention not at this time more particularly mentioned will be more fully understood from the following detailed description of my present invention.

The invention consists, primarily, in the novel molding apparatus hereinafter more fully set forth; and, furthermore, this invention consists in the novel arrangements and combinations of the devices and parts, as well as in the details of the construction of the same, all of which will be more fully described in the following specification, and then finally embodied in the clauses of the claims which are appended to this specification and which form an essential part of the same.

The invention is clearly illustrated in the accompanying drawings, in which:—

Figure 1 is a top or plan view of the novel molding apparatus embodying the principles of the present invention. Fig. 2 is a front elevation of the same, and Fig. 3 is a cross-section, taken through the handle-portion on line 3—3 in said Fig. 2, and showing the said molding-apparatus in side-elevation. Fig. 4 is a longitudinal vertical section taken on line 4—4 in said Fig. 1. Fig. 5 is a detail horizontal section taken on line 5—5 in said Fig. 3, and looking in a downward direction. Fig. 6 is a detail longitudinal vertical section, similar to that shown in Fig. 4, but illustrating a ring-mold secured in the mold-chuck. Fig. 7 illustrates the inner faces of the separated halves or portions of said ring-mold. Fig. 8 illustrates a mold for scarf-pins, buttons, or the like; and Fig. 9 illustrates an ingot-mold, or other similar mold.

Similar characters of reference are employed in all of the above described views to indicate corresponding parts.

Referring now to the several figures of the said drawings, the reference-character 1 indicates the complete molding apparatus embodying the principles of the present invention, the same comprising a handle-portion 2 which is secured, in any suitable manner, to a handle or arm 3. This said handle or arm 3 is preferably stiffened or strengthened by means of a longitudinally extending rib, flange or lip 4. Secured to the end of said handle or arm 3, and forming preferably an integral part thereof, is a plate 5, and integrally secured to the lower edge of said plate 5 and at right angles thereto is a flange or projection 6. Secured to the face of said plate 5, in any suitable manner, is a yoke-piece 7, the face of which is preferably reinforced with enlargement or boss 8. This said yoke-piece 7 is provided with a screw-threaded hole 9 adapted to receive the screw-threaded shank of a binding or tightening screw 10 which is provided with a suitable turning or finger-piece, as 11. Secured to the bottom of said flange or projection 6, by means of rivets, or in any other convenient manner, is a backwardly extending plate or arm 12 provided at suitable distances from each other, with holes or perforations 13. Registering with said plate or arm 12 is another plate or arm 14, one end of which is provided with a downwardly extending pin, lug or stud, 15, rigidly secured thereto. This said plate or arm is further provided with screw-threaded holes 16 which are spaced so as to register with said holes or perforations 13 of said plate or arm 12. The screw-threaded shank of a thumb or other suitable screw 17 is passed through a hole or perforation 13 of said plate or arm 12, and screwed into one of said screw-threaded holes 16 of said plate or arm 14, the downwardly extending pin 15 of said plate or arm 14 engaging with one of the holes or perforations 13, substantially as shown, thus operatively locking together the two arms or plate 12 and 14 and also affording an adjusting means for lengthening or shortening the said arms or plates, so as to provide a holding means for various sizes of matrix-blocks, to be presently described. Extending upwardly from the free end of said arm or plate 14, and forming preferably an integral part thereof, is an arm 18 upon the upper end of which is a nut-piece 19 which is provided with a suitably screw-threaded hole or perforation adapted to receive the screw-threaded shank 20 of suitable clamping-screw 21. The said shank 20 of said clamping-screw 21 is provided at its free end with a clamping member or disk as 22, adapted to swivel upon said shank 20, the said member 22 being provided with suitable teeth 23 for gripping and holding the end of a melting block 24. This said melting block 24 is usually a piece of charcoal, but any other suitable material may be used; and, it is gripped at one end by the said clamping-screws 21 and forced against suitably disposed holding points or spurs 25 which are rigidly secured to the back of said plate 5, for firmly holding the same in its operative position. The said melting-block 24 is provided upon its upper surface or side with a hollowed-out portion or depression 26 which is concave in cross-section and slopes downwardly to meet the upper edge of the said plate 5. This said hollowed-out portion forms a melting surface upon which gold or other metal is to be laid and melted by means of the flame of an ordinary blow-pipe, or other heat-producing means, as will be clearly evident.

The mold-chuck formed by the plate 5 and the yoke-piece 7, with its thumb-screw 11, is adapted to receive a mold and retain the same. The said plate 5 being provided with a vertical concave groove 27, or the equivalent thereof, which forms a pouring lip or channel adapted to guide the melted gold or other metal into the mold held against the said plate 5, as will be clearly evident from an inspection of the accompanying drawings.

Referring now to the first five figures of the drawings, there is illustrated therein in connection with the mold-chuck above described, an ingot mold which comprises a U-shaped body-portion 28 which forms the sides and bottom of said mold. This U-shaped body-portion is placed in position against the said plate 5 and adjacent to the groove 27, the said plate 5 forming a wall of the mold. A separate back-piece 29 is then placed against the said U-shaped body-portion 28, the said back-piece forming the other wall of said mold, and being provided with a pressed-out or concaved portion 30 at its upper end which serves as a guide for the flow of the melted metal when the latter is poured into the mold, by tipping the apparatus. The thumb-screw 11 is screwed against the back-piece 29, thus firmly clamping the same and the U-shaped body-portion in its operative relation with the plate 5 and the said melting-block 24, in a manner clearly to be understood from an inspection of the said drawings.

Referring now more particularly to Figs. 6 and 7 of the accompanying drawings, there is illustrated in connection with the mold-chuck above described, a ring-mold which is secured in the said molding apparatus in substantially the same manner as above described. This said ring-mold comprises an inner face 31 provided with a guide-duct 32, the upper portion of which is cut away, as at 33, so as to be brought in proper registration with the said groove 27 of said plate 5. The inner face 31 is further provided with a circular groove 34 forming one-half of the ring-mold proper, from which radiates the air-vents 35. A centering pin 36 is also secured to this inner face 31. The outer face 37 of said ring-mold is similarly provided with a guide-duct 38, a circular groove 39, and air-vents 40, all arranged so as to register with the corresponding parts of the inner face 31, when the two sections or halves of the mold are placed together, in which event the said centering-pin 36 enters a centering hole or perforation 41 in said outer-face 37, in the manner shown. The above-described and many other types of molds may be used in connection with the novel molding apparatus embodying the principles of the present invention, as will be clearly evident, such for instance, as those shown in Figs. 8 and 9, the same being, respectively, a pin or button mold 42, and an ingot or bar-mold 43, it being clearly understood that the invention is not limited to the use of such mold, as illustrated in the accompanying drawings, but being adapted for use with all classes and designs of similar molds.

I am aware that changes may be made in the various arrangements and combinations of the devices and parts, as well as in the details of the construction of the same, without departing from the scope of the present invention, as defined in the appended claims. Hence, I do not limit my invention to the exact arrangements and combinations of the devices and parts, as illustrated in the accompanying drawings, and as described in the accompanying specification, nor do I confine myself to the exact details of the construction of said parts.

I claim:

1. In a molding apparatus, the combination with a plate, of a handle or arm, a handle-member secured upon the end of said handle or arm, a yoke secured to said plate, means connected with said yoke for retaining a mold against the face of said plate, a melting block provided at one end with a hollowed-out portion adapted to register with the upper edge of said plate, and means for retaining said melting block in operative relation to said plate, substantially as and for the purposes set forth.

2. In a molding apparatus, the combination with a plate, said plate being provided with a vertical groove near its upper edge and an outwardly projecting flange at its lower edge, of a handle or arm, a handle-member secured upon the end of said handle or arm, a yoke secured to said plate, means connected with said yoke for retaining a mold against the face of said plate, a melting block provided at one end with a hollowed-out portion adapted to register with the upper edge of said plate, and means for retaining said melting block in operative relation to said plate, substantially as and for the purposes set forth.

3. In a molding apparatus, the combination with a plate provided with a vertical groove near its upper edge and an outwardly projecting flange at its lower edge, of a handle or arm, a handle-member secured upon the end of said handle or arm, a yoke secured to said plate, a thumb-screw operatively arranged in said yoke and adapted to retain a mold against the face of said plate, a melting block provided with a hollowed-out portion adapted to register with the upper edge of said plate, and means for retaining said melting-block in operative relation to said plate, substantially as and for the purposes set forth.

4. In a molding apparatus, the combination with a plate provided with a vertical groove near its upper edge and an outwardly projecting flange at its lower edge, of a handle or arm, a handle-member secured to the end of said handle or arm, a yoke secured to said plate, a thumb-screw operatively arranged in said yoke and adapted to retain a mold against the face of said plate, a melting-block provided with a hollowed-out portion adapted to register with the upper edge of said plate, and means for retaining said melting-block in operative relation to said plate, comprising a pair of spurs rigidly secured to the back of said plate and adapted to engage one end of said matrix-block, a backwardly extending-arm rigidly secured to the flange of said plate, an adjustable arm connected with and secured to said backwardly extending arm, an upwardly extending arm secured to the outer end of said adjustable arm, a nut-piece upon the free end of said upwardly extending arm, and a clamping-screw operatively connected with said nut-piece and adapted to engage with the other end of said matrix-block, substantially as and for the purposes set forth.

5. A supporting frame of the character specified provided with means for the attachment thereto of a melting block, an upwardly extending plate upon said frame, and means for the attachment of a mold plate upon said frame and against said upwardly extending plate, said plate and the mold-plate providing a mold, and all arranged so that the melted metal can be flowed from said melting block into said mold, substantially as and for the purposes set forth.

6. A supporting frame of the character specified provided with means for the attachment thereto of a melting block, an upwardly extending plate upon said frame, and means for the attachment of a mold-plate upon said frame and against said upwardly extending plate, said plate and the mold-plate providing a mold, and means connected with said supporting frame for tipping said frame so that the melted metal can be flowed from said melting block directly into said mold, substantially as and for the purposes set forth.

7. A supporting frame of the character specified provided with means for the attachment thereto of a melting block, an upwardly extending plate upon said frame, and means for the attachment of a mold-plate upon said frame and against said upwardly extending plate, said plate and the mold-plate providing a mold, and an arm provided with a handle extending from said supporting frame for tipping said frame so that the melted metal can be flowed from said melting block directly into said mold, substantially as and for the purposes set forth.

In testimony that I claim the invention set forth above I have hereunto set my hand this 1st day of August 1908.

GEORGE A. STOTZ.

Witnesses:
 GEORGE D. RICHARDS,
 F. H. W. FRAENTZEL.